March 30, 1965    J. M. BLOCHER, JR., ETAL    3,175,922
METHOD FOR COATING ACTINIDE PARTICLES
Filed Aug. 8, 1961
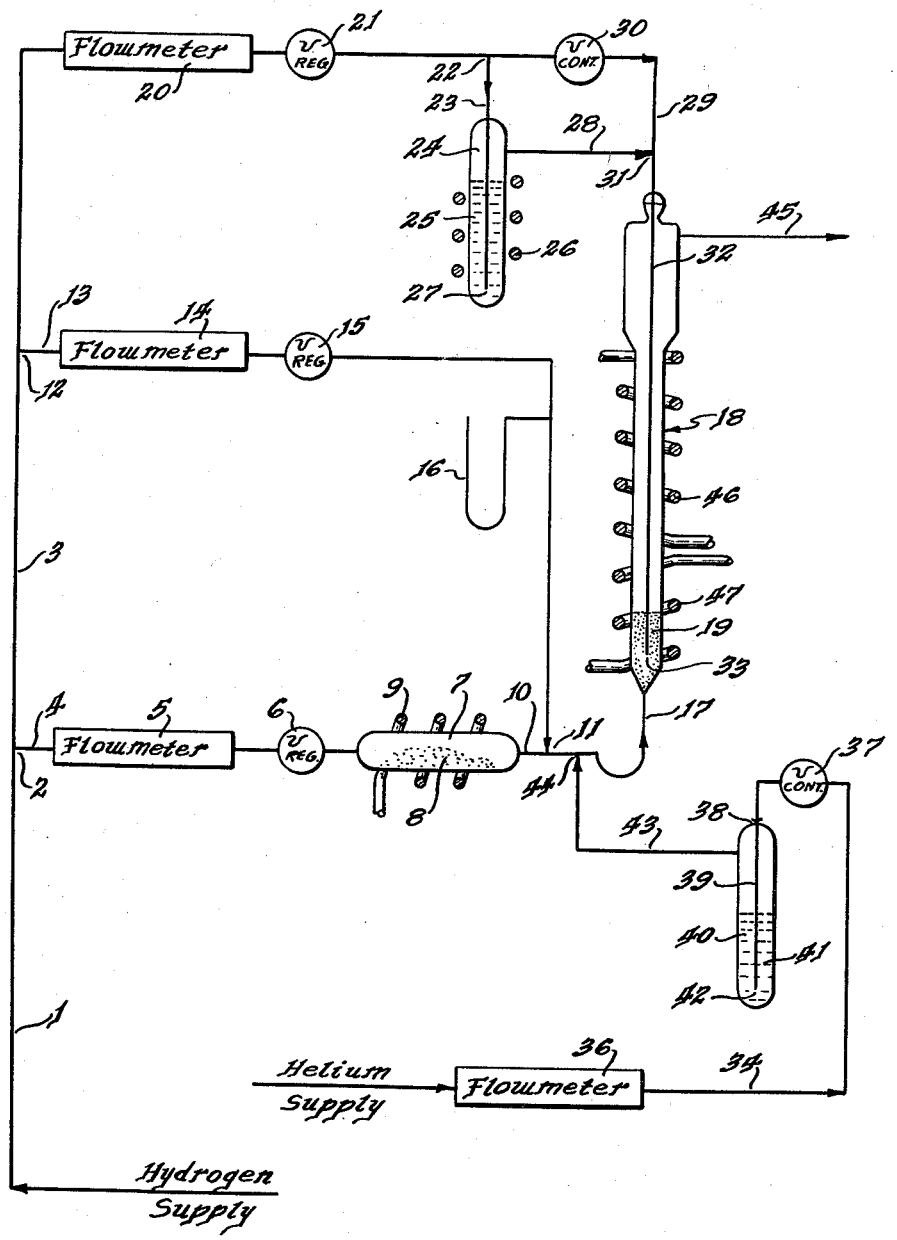
INVENTORS
John M. Blocher, Jr.
Melvin F. Browning
BY
Roland A. Anderson
Attorney

United States Patent Office 3,175,922
Patented Mar. 30, 1965

3,175,922
METHOD FOR COATING ACTINIDE PARTICLES
John M. Blocher, Jr., and Melvin F. Browning, Columbus, Ohio, assignors to the United States of America as represented by the United States Atomic Energy Commission
Filed Aug. 8, 1961, Ser. No. 130,193
3 Claims. (Cl. 117—100)

The invention relates to a novel refractory coated article, and more particularly to coated nuclear reactor fuel and blanket pellets or particles, to a method for making the same, and to a novel apparatus for carrying out the coating process.

Some of the nuclear reactors of recent design contemplate forming the fuel, or blanket material, into particles or pellets, rather than into comparatively large shapes such as rods or slugs.

Proposals have been made for giving such particles coatings of various kinds, in order to protect them from corrosion and to confine the radioactive fission products. Such coatings would be of value not only when the particles are to be used in a loose bed reactor, but also when they are to be placed in a matrix of some kind, metallic, ceramic, or of the compacted type. Even when the matrix is clad in the manner of conventional fuel elements the localization of fission products by the coatings is still highly desirable since it counteracts the buildup of internal pressure by fission product gases, which tends to rupture the cladding tubes.

The choice of coating materials for use in reactors of the thermal type is greatly limited by nuclear absorption considerations; only certain refractory materials may be used, and among those tried have been oxides of the class consisting of alumina, zirconia and yttria. These have been deposited on the fuel particles by hydrolyzing at high temperature the chlorides of the metals of the oxides in the gaseous state in an atmosphere containing water vapor. The following chemical equation for the hydrolysis of aluminum chloride vapor is typical of the hydrolysis of the other volatile chlorides of the class mentioned:

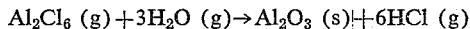

$$Al_2Cl_6 \text{ (g)} + 3H_2O \text{ (g)} \rightarrow Al_2O_3 \text{ (s)} + 6HCl \text{ (g)}$$

When the above reaction is carried out in a suitable fluidized bed the solid alumina, or other refractory oxide, can be made to deposit quite evenly upon the fuel or blanket particles, and the by-product hydrogen chloride is led off at the top.

In actual use, however, coatings of alumina, zirconia and yttria have not been entirely satisfactory; under the severe conditions of thermal stress encountered in reactors, cracks and other discontinuities have developed thought to be mainly due to the differences in thermal expansion between the coatings and the fuel or blanket particles such as $UO_2$.

It is, accordingly, an object of the invention to provide a refractory coating for nuclear reactor fuel or blanket particles which will be less subject to cracking or other failure than coatings now in use.

It is a more particular object to provide a coating which will avoid cracking by having thermal expansion characteristics substantially identical with those of the coated fuel or blanket material, particularly when the latter is uranium dioxide.

It is a further object to provide a method for making such a coating.

It is a further object to provide an apparatus by means of which the method may be carried out in a dependable manner.

All the foregoing objects are attained by our discovery that a refractory coating, such as alumina, zirconia, and yttria, may be given improved resistance to cracking and other failure by modifying its thermal expansion characteristics with minor amounts of chromia, which may be codeposited with the other refractory material by a novel method of simultaneous, or at least closely sequential reduction of chromyl chloride and hydrolysis of the chloride of the other refractory material precursor such as aluminum chloride, the two reactions occurring in a fluidized bed of the particles to be coated.

We have further discovered that a novel fluidized bed apparatus, involving certain critical features, may be made to carry out the various reactions for the particle coating together in one operation.

Reference is now made to the only figure of the drawing which is a schematic representation of an apparatus for carrying out the method of the invention.

A hydrogen supply line 1 leads from a hydrogen supply source (not shown) to a junction 2, from which issues trunk line 3 and branch line 4, which branch line leads through flowmeter 5 and valve 6 to aluminum chloride vaporizer 7. Vaporizer 7 has a supply of solid aluminum chloride 8 and is surrounded by coaxial electric heater 9 which heats the aluminum chloride 7 sufficiently to vaporize it and cause it to entrain with the hydrogen, without being reduced thereby. The entrained mixture then leaves vaporizer 7 through outlet line 10 to junction 11.

Meanwhile the larger portion of the hydrogen passes up through trunk line 3 to junction 12 where the greater portion in the trunk line 3 leaves it to go through branch line 13 which carries the main fluidizing gas flow. This flow passes through flowmeter 14 and regulating valve 15 and past connecting manometer 16 to junction 11, where it is rejoined by the hydrogen with its entrained aluminum chloride vapor coming from vaporizer 7. The two streams continue together through main fluidizing gas line 17 into the bottom of fluidized bed reactor 18, in which the fluidized bed of $UO_2$ particles is shown at 19.

Meanwhile the remaining minor portion of the hydrogen in trunk line 3 continues to flow upward beyond junction 12 through flowmeter 20 and regulating valve 21 to junction 22. From junction 22 issues water vaporizer branch line 23 which leads into water vaporizer 24 having a supply of water shown at 25 and a coaxial heater 26. Line 23 leads to point 27 near the bottom of the vaporizer in order to bubble the hydrogen through the water 25, the hydrogen thereby becoming heavily entrained with water vapor without having to raise the water 25 to the boiling point. The entrained mixture of hydrogen and water vapor leave vaporizer 24 through outlet line 28. Shunt line 29 with its control valve 30 shunts across the vaporizer 24, and it can be used by opening valve 30 whenever the water vapor concentration in the reactor becomes too high.

Outlet line 28 connects at junction 31 with refractory tube 32 which leads through the top of reactor 18 to a point 33 beneath the surface of the bed 19 and approximately midway down its length. This is an important feature of the entire apparatus; in order to explain its importance, however, it is necessary to continue with a description of the apparatus, and a return will be made to this feature in the ensuing discussion.

Inert gas supply line 34 leads from an inert gas source, such as one of helium (not shown) through flow-meter 36 and control valve 37 to junction 38 where, it connects with glass tube 39 which leads through the top of chromyl chloride vaporizer 40 and a supply of liquid chromyl chloride 41 to the point 42 near the bottom of vaporizer 40. The inert gas bubbles up through the chromyl chloride 41 and becomes entrained with its vapor to the extent needed without electrical heating, and the entrained mixture leaves the vaporizer 40 through outlet line 43 which leads to main fluidizing gas line 17 at junction 44.

Thus it can be seen that main fluidizing gas line 17 carries, in addition to the fluidizing gas from line 13, the entrained vapors of aluminum chloride from vaporizer 7 and those of chromyl chloride from vaporizer 40. The commingled gases pass upwardly through the fluid bed 19 and bring about certain reactions which will be explained in more detail later on, and the unused fluidizing gas and other vapors, and the by-products of the reactions, pass out of the reactor 18 through outlet line 45 which leads to filters (not shown), traps for solids (not shown) and the like, as are customary in such cases to prevent the escape of noxious fumes and solids to the atmosphere. The reactor 18 is provided with coaxial electric heaters 46 and 47 to maintain the temperature necessary for carrying out the reactions.

As above stated, the amount of the chromia to be deposited along with the alumina or other main refractory material, in order to modify its expansion characteristics, we have discovered to be quite small. Anything more than 5 weight percent of the coating is believed to be undesirable, and from there on down to a trace, chromia will modify the characteristics of the coating. The particular percentage to be used depends, of course, to a large extent on the geometry of the particles to be coated; larger pellets require a coating with a better match of expansibility than do smaller particles.

For $UO_2$ particles having a particle size from about 10 to 1250 microns we have used a coating of about 1.5 weight percent chromia and the balance alumina.

Returning now to a feature of the reactor apparatus already referred to, the placement of the end of tube 32 in the fluid bed 19 should be about half-way down into the bed, at 33. Empirically we have established that this is the case since if the pipe is placed appreciably lower the coating of the particles is unsatisfactory.

We believe that the foregoing empirical finding is to be accounted for as will now be explained. This explanation is not offered as one that has been conclusively established, so we do not, of course, wish to be rigorously bound by it. As above explained, there is every reason to believe that the deposition of alumina is brought about by a simple hydrolysis reaction according to the following chemical equation:

$$2AlCl_3 \text{ (g)} + 3H_2O \text{ (g)} \rightarrow Al_2O_3 \text{ (s)} + 6HCl \text{ (g)}$$

Chromyl chloride, on the other hand, instead of being hydrolyzed by the water vapor, is, we believe, reduced in the lower part of the bed 19, beneath the level of point 33, by hydrogen according to the following reaction:

$$2CrO_2Cl_2 \text{ (g)} + 3H_2 \text{ (g)} \rightarrow Cr_2O_3 \text{ (s)} + 4HCl \text{ (g)} + H_2O \text{ (g)}$$

It is important that point 33 be kept high enough in the bed 19 to permit the reducing action to substantially take place in the lower zone and substantially maintain the hydrolysis in the upper zone.

Our finding shows that it is also possible to raise the point 33 too high in the bed 19, and when this happens we believe that the aluminum chloride does not have a sufficiently large upper zone in which to react, and therefore passes through the bed only partially reacted. Consequently, the placement of point 33 must be a substantial distance under the surface in order to define two zones of sufficient length to permit the hydrolysis reaction to proceed substantially in the upper zone, and the reducing reaction substantially in the lower zone, and as pointed out above, this placement must be about half-way down in the bed and also not very far above it as experience has shown.

The reactions within the bed 19 may be carried out within the temperature range of 300° to 1400° C.; below this, deposition does not take place well and above it the coatings become excessively large grained. The unsatisfactory deposition below 300° C. may well be explained by the fact that since chromia and alumina are produced in different zones of the reactor the two do not homogenize to form a discrete adherent coating when they are too cool. Whatever the exact mechanism, the fact that the two oxides are probably produced sequentially rather than simultaneously within the reactor does not prevent the coating from being quite homogeneous if these temperature conditions are observed.

To maintain the temperature range above set forth the walls of the reactor must be heated somewhat higher in order to offset the cooling effect of the fluidizing gas; the wall temperature range is therefore from about 700° to 1400° C., the latter being critical since if this temperature is exceeded the particles will receive an excessively large grained coating. Our preferred wall temperature is 1100° C.

The aluminum chloride vaporizer should be run at 150° to 160° C., and the chromyl chloride vaporizer at about 25° C., or room temperature. These temperatures may be varied somewhat in order to change the ratio of alumina to chromia desired in the coating; the ratio may also be changed by varying the flow rates of the hydrogen and helium gas streams, by adjusting the control valves 6 and 36 to effect aluminum chloride and chromyl chloride respectively. The combined gas flow through the fluidized bed should be varied according to the size of the particles being coated, and the thickness of the coating desired; this flow may range from about 0.2 to about 10 linear feet per second.

*Example*

100 grams of $UO_2$ of −270 +325 mesh were placed in a reactor vessel of the type shown in the only figure of the drawing. The reactor wall temperature was maintained at 1100° C., the aluminum chloride vaporizer at 150°–160° C., and the chromyl chloride vaporizer at 25° C.

The readings of gas flows through the four flowmeters of the apparatus, which were automatically adjusted by the flowmeters to give equivalent readings of flows under standard conditions of temperature and pressure, were as follows:

|  | L./min. |
|---|---|
| Hydrogen flow through aluminum chloride vaporizer | 0.7 |
| Main hydrogen fluidizing gas flow | 2.4 |
| Hydrogen gas flow through water vaporizer | 1.0 |
| Helium gas flow through chromyl chloride vaporizer | 1.01 |

Operation of the apparatus under these conditions resulted in the following approximate molar composition of the combined gases and vapors as determined from overall material balance:

|  | Mole percent |
|---|---|
| $H_2$ | 94.2 |
| $AlCl_3$ | 0.9 |
| $CrO_2Cl_2$ | 0.005 |
| $H_2O$ | 4.8 |
| He | 0.2 |

Examination of the particles showed them to be uniformly coated with adherent, homogeneous, uniform coatings of glass-like appearance, 10 microns thick, 1.5 weight percent, chromia, and without discontinuities.

It will be understood that this invention is not to be limited to the details given herein, but that it may be modified within the scope of the appended claims. The term nuclear reactor particle shall be taken to include particles of fuel or of blanket material.

What is claimed is:

1. A method for coating actinide oxide particles comprising placing them in a vertical reactor of the fluidized bed type, fluidizing them in a bed vertically from the bottom with hydrogen containing minor amounts of the vapors of chromyl chloride and a chloride of a member of the class consisting of aluminum, zirconium and yttrium maintaining the temperature of the fluidized bed within the range of 300° to 1400° C., and introducing water vapor into the bed about halfway down the vertical length of the bed, the ratio of the said chromyl chloride vapor to the vapor of the chloride of the class consisting of aluminum, zirconium and yttrium being up to 5 weight percent, the chromyl chloride vapor being reduced by hydrogen to chromia and the chloride vapor of the said class being hydrolyzed to the corresponding oxide.

2. A method of coating $UO_2$ particles, comprising placing them in a vertical fluidized bed reactor, fluidizing them in a bed vertically from the bottom with hydrogen containing the vapors of chromyl chloride and aluminum chloride, maintaining the temperature of the bed within the range of 300° to 1400° C., and introducing water vapor into the bed about halfway down the vertical length of the bed whereby the aluminum chloride vapor is hydrolyzed to aluminum and the chromyl chloride vapor is reduced to chromia, the molar ratio of the chromyl chloride vapor to the aluminum chloride vapor being about 1 to 180.

3. The method of claim 2 where the combined gases and vapors within the reactor are composed of about 94 mole percent hydrogen, about 0.9 mole percent aluminum chloride vapor, about 0.005 mole percent chromyl chloride vapor, about 4.8 mole percent water vapor, and about 0.2 mole percent helium.

References Cited by the Examiner
UNITED STATES PATENTS

| | | | |
|---|---|---|---|
| 2,399,717 | 5/46 | Arveson | 117—100 |
| 2,586,818 | 2/52 | Harms | 117—100 |
| 2,644,769 | 7/53 | Robinson | 117—100 |
| 2,708,622 | 5/55 | Stone | 117—100 |
| 2,768,095 | 10/56 | Tadema et al. | 118—303 |
| 2,786,801 | 3/57 | McKinley et al. | 117—100 |
| 2,907,705 | 10/59 | Blainey | 204—193.2 |
| 2,955,956 | 10/60 | Baugh et al. | 117—100 |
| 2,967,811 | 1/61 | Flint | 204—193.2 |

OTHER REFERENCES

Dayton et al.: Battelle Memorial Inst., BMI-1409, Feb. 1, 1960, p. 74 relied on.

Nuclear Power, July 1960 (page 98 relied on).

Browning et al.: Alumina Coating of $UO_2$ Shot by Hydrolysis of Aluminum Chloride Vapor, Battelle Memorial Inst., BMI-1471, pp. 1–11, Oct. 25, 1960.

Reactor Core Materials, vol. 3, No. 4, November 1960, pp. 48–57, p. 52 relied on.

Battelle Memorial Inst., BMI-1486, Sept. 16, 1960, pp. 2–8 relied on.

Smalley et al.: Alumina Clad $UO_2$ for Fuel Applications, Battelle Memorial Inst., BMI-1321, Feb. 18, 1959, pp. 1–6, p. 1 relied on.

RICHARD D. NEVIUS, *Primary Examiner.*

O. R. VERTIZ, *Examiner.*